United States Patent
Singh Bawa et al.

(10) Patent No.: US 10,972,921 B2
(45) Date of Patent: Apr. 6, 2021

(54) WIRELESS SIGNAL STRENGTH OPTIMIZER

(71) Applicant: ACCENTURE GLOBAL SOLUTIONS LIMITED, Dublin (IE)

(72) Inventors: Gurpreet Singh Bawa, Chandigarh (IN); Kaustav Pakira, Chandannagar (IN); Sanjay Sharma, New Delhi (IN); Tejas Wagh, Aurangabad (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 108 days.

(21) Appl. No.: 16/552,593

(22) Filed: Aug. 27, 2019

(65) Prior Publication Data

US 2021/0067983 A1    Mar. 4, 2021

(51) Int. Cl.
*H04W 24/02* (2009.01)
*H04W 16/22* (2009.01)
*H04W 16/18* (2009.01)

(52) U.S. Cl.
CPC .......... *H04W 24/02* (2013.01); *H04W 16/18* (2013.01); *H04W 16/22* (2013.01)

(58) Field of Classification Search
CPC ...... H04W 24/02; H04W 16/22; H04W 16/18
See application file for complete search history.

(56) References Cited

U.S. PATENT DOCUMENTS

| 9,002,375 | B1* | 4/2015 | Lerner | H04W 4/029 455/456.1 |
|---|---|---|---|---|
| 2013/0282438 | A1* | 10/2013 | Hunter | H04W 12/084 705/7.32 |
| 2017/0290075 | A1* | 10/2017 | Carbajal | H04W 64/006 |
| 2017/0293675 | A1* | 10/2017 | York | G06F 16/24578 |
| 2018/0060302 | A1* | 3/2018 | Liang | G06F 40/289 |
| 2018/0330000 | A1* | 11/2018 | Noble | G09B 7/02 |
| 2019/0370347 | A1* | 12/2019 | Levy | G06F 16/355 |

* cited by examiner

*Primary Examiner* — Andrew Lai
*Assistant Examiner* — Mohammed M Murshid
(74) *Attorney, Agent, or Firm* — Mannava & Kang, P.C.

(57) ABSTRACT

A wireless signal strength monitoring system employs a wireless signal strength driver model to monitor and maintain wireless signal strengths for mobile devices on a wireless communication network. The monitoring system parses activity logs of network entities including the mobile devices on the wireless communication network to generate a plurality of multilevel token sets. A selected one of the plurality of multilevel token sets is used to generate a wireless signal strength driver model along with topics from clusters of homogenous logs of the activity logs. The drivers of the wireless signal strength are identified from the wireless signal strength driver model. The drivers are used to monitor and improve the wireless signal strengths for the mobile devices on the wireless communication network.

20 Claims, 10 Drawing Sheets

WIRELESS SIGNAL STRENGTH OPTIMIZER

BACKGROUND

The key to a good wireless deployment is proper planning which includes a set of goals and requirements to be met. Determining minimum signal strength requirements in a coverage area is a part of the network requirements list. Desired signal strength for optimal performance can vary based on many factors such as background noise in the environment, the number of clients on the network, the desired data rates, the applications to be used, etc. For example, a Voice over Internet Protocol (VoIP) or a Voice over Wireless Fidelity (VoWiFi) may require better coverage than a barcode scanner system in a warehouse. Generally, the strength of a wireless signal can be gauged either by analyzing the wireless signal captured by a mobile device from a site antenna or vice versa. The captured signal strength is then equated to the original signal strength thereby providing an estimate of the effective signal strength along with the signal loss during the course of the signal path.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
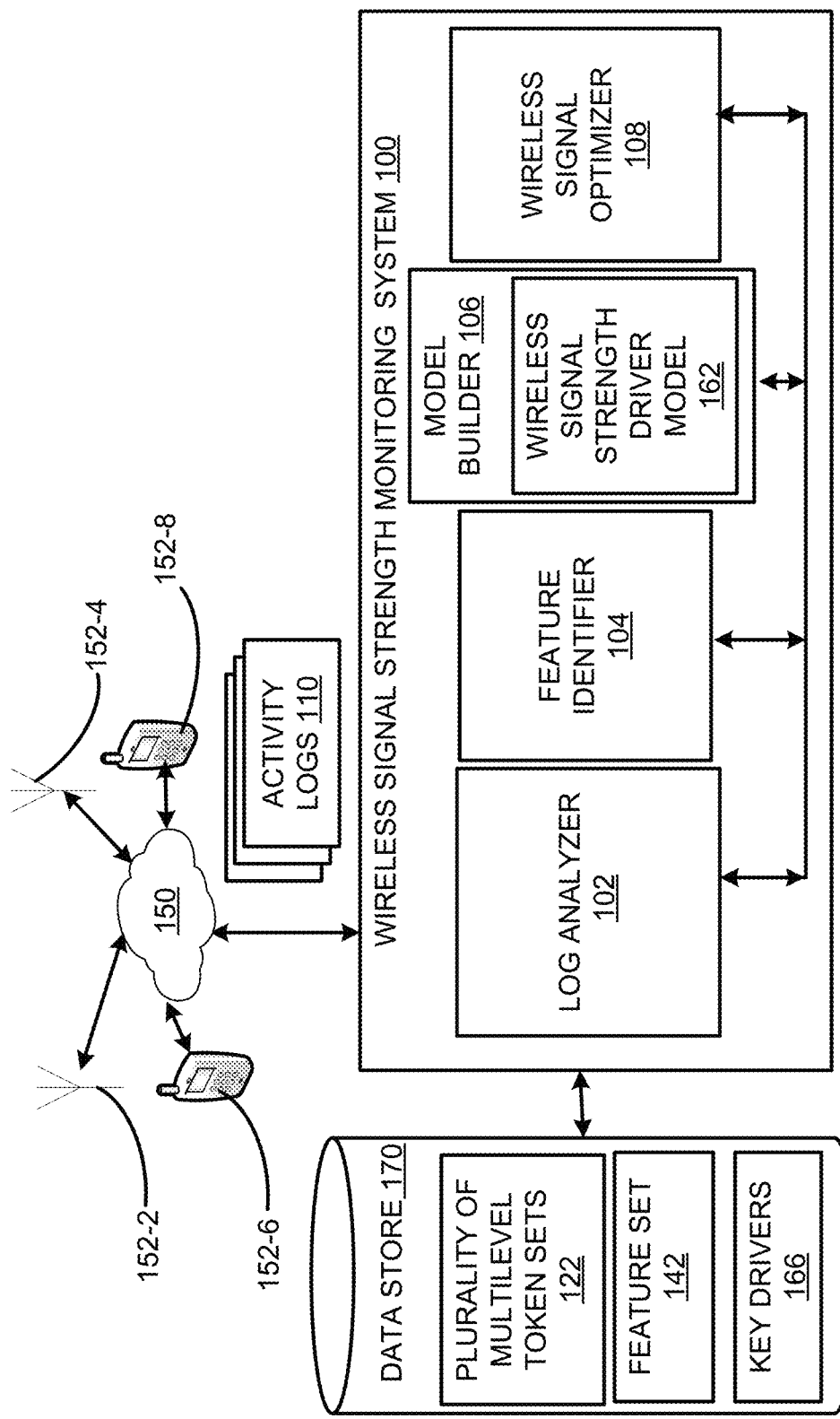
FIG. 1 shows a block diagram of a wireless signal strength monitoring system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A wireless signal strength monitoring system that builds a wireless signal strength driver model and employs the wireless signal strength driver model to identify a weak signal at a mobile device and effectuate actions to improve service within a wireless communication network is disclosed. The activity logs of a plurality of network entities on the wireless communication network are initially accessed and analyzed. The network entities can include the mobile devices, the access points, site antennas, etc., that enable exchanging wireless signals in the wireless communication network. The activity logs can include the temporal data related to the signals, the attributes of the transmissions and additionally, the attributes of the network entities involved in the transmissions. The activity logs may be stored at the corresponding network entities in an unstructured format. The activity logs are initially parsed and tokenized to generate a plurality of token sets. The token sets can include one or more sets of bigrams, sets of trigrams or other n-gram sets where n is greater than one and hence each token includes phrases with two or more words.

Each of the tokens in each of the plurality of token sets is scored in order to determine whether or not the token should be selected for further processing. In an example, a scoring methodology which includes estimating a Ted Dunning $G^2$ score for each token can be employed for the selection of tokens to be included in the token sets. A plurality of multilevel token sets are generated as subsets corresponding to each of the token sets with one or more sets of the selected bigrams, the selected trigrams and other sets of the selected n-grams. The multilevel token sets are further scored using the term frequency inverse document frequency (TFIDF) methodology. The top-scoring multilevel token set is selected for inclusion as features to be used for building the wireless signal strength driver model. The TF measure is further used for constructing topic models. More particularly, the activity logs are modeled in a manner that smaller representations of the constituent units of the logs are obtained which in turn allows analysis of the entire activity log data in an efficient manner while upholding the statistical associations necessary for wireless signal strength driver modeling task. Therefore, only the most frequent and similar latent structures are established by passing the TF document term matrix to the Latent Dirichlet Allocation (LDA). For each of the structures, the top n-grams that best represent the individual structures are obtained as the top m (m=1, 2, . . . ) conversant topics which are also included as features for building wireless signal strength driver model. The feature set for a wireless signal strength driver model therefore includes the tokens from the multilevel token set selected from the plurality of multilevel token sets and the top m conversant topics obtained from the activity logs.

In addition, subnets or smaller clusters of homogenous logs present in the activity logs are identified based on logical factors such as source, etc. The clusters of homogenous logs are generated by applying self-organizing maps (SOMs) on the TFIDF scores of each of the tokens from the plurality of multilevel token sets to obtain the clusters of homogenous logs each of which groups the activity logs by similar context. The wireless signal strength driver model is generated as a multinomial logit model using the feature set derived from the activity logs wherein the wireless signal strength is taken as the target variable and the features from the feature set form the independent variables. The feature measures or the importance of features for estimating the wireless signal strength at the mobile devices can be determined either from the TFIDF scores or from similarity measures such as Jaccard/Levenshtein or Cosine similarity measures. Further key driver analysis (KDA) is employed to identify the most significant drivers of the wireless signal strength. This analysis enables exploring the relationships between the drivers and the target variable i.e., the wireless signal strength and quantify the association between the most significant drivers and the wireless signal strength. The wireless signal strength driver model thus generated can be used for obtaining the standardized beta estimates against each of the independent variables. The beta estimates can be indicative of the contribution of the independent variables to the wireless signal strength variable. The multinomial logit model representation can include a p-value against each of the drivers, which p-value denotes the significance of the driver in influencing the wireless signal strength. In an example, it was observed that key drivers such as network bandwidth and geographical proximity to a signal source affect the wireless signal strength positively so that greater network bandwidth or greater proximity to the signal source (i.e., lesser distance between a mobile device and the signal source) improve the wireless signal strength. Other key drivers include changing Global Positioning System (GPS) locations and multiple login authorizations have a negative effect on the wireless signal strength.

The wireless signal strength driver model disclosed herein serves a technical function of estimating the wireless signal strengths at the mobile devices on the wireless communication network. The signal data associated with the data transmissions of one or more mobile devices is received and applied to the wireless signal strength driver model in order to obtain the wireless signal strengths for each of the mobile devices. The wireless signal strengths can be compared to an empirically-determined signal strength threshold in order to determine the mobile devices that have weak signals. If a mobile device is identified as having a weak signal, the component values associated with drivers in the wireless signal strength driver model are obtained. The values of the drivers can be compared with the corresponding driver thresholds and various actions can be initiated based on the drivers that fail to meet the driver thresholds.

The wireless signal strength monitoring system as disclosed provides for estimating wireless signal strengths at mobile devices on a wireless communication network and effectuating various actions to improve the wireless signal strengths. Estimated time of signal arrival, difference in time of arrival, level of power, angle of incidence, etc., are all contributors of the wireless signal strength in network-based location systems. The system processes involved in the trips made by the cellular signal from the site to the mobile unit, generate huge amounts of log messages from the above-mentioned components. While the obtained location and the estimated strength of signal helps in evaluating coverage, a complete analysis of the produced log messages would help track down the key drivers behind the fluctuation of the wireless signal strength. Analyzing the generated logs from the different sources during the course of the signal transmission processes enables building the wireless signal strength driver model against the signal strength measurements at that time point. The wireless signal strength driver model in turns helps in identifying the key drivers (tokens from the log texts) which have statistically significant effect on the wireless signal strength from the activity log files generated in the wireless communication system.

The monitoring system disclosed herein thus makes use of the data in the activity logs to obtain estimates of the wireless signal strengths in the wireless communication networks. The monitoring system combines Natural Language Processing (NLP) techniques such as parsing and customized tokenization methodologies normally applied to textual data to estimate physical quantities like wireless signal strength in communication networks. The selection of n-gram tokens with n>1 ensures that the context is captured along with the token as opposed to the token alone that is captured in case of unigrams. The customized tokenization therefore produces meaningful multilevel n-gram tokens which mitigates the need for manually annotating each log file for the corresponding signal strength. The usage of normalized frequency weights enables the tokens to be readily used with the LDA model. Additionally, layering in the TFIDF weights not only captures the frequencies of the tokens in the driver selection but also the significance of each of the tokens is captured as well so that those tokens that may occur infrequently in the activity logs yet have a considerable impact on the wireless signal strength are captured in the wireless signal strength driver model. Moreover, hypernyms are extracted from the latent structures are identified from the activity logs enable categorizing the activity logs thereby providing better insights when the drivers are identified. Modeling the feature set based on TFIDF scores as well as similarity scores help in capturing the relation between each log to each of the multilevel token sets. Thus, on fitting the multinomial logit model, a summarized representation of the factors affecting the wireless signal strength is obtained which helps us to calculate the standardized beta coefficients for each of the features in addition to the respective significance levels of the features. Finally, the wireless signal strength monitoring system as disclosed herein effectuates an improvement to the wireless communication networks by enabling detection of weak signals at mobile devices and enabling automatic execution of actions to improve the wireless signal strengths.

FIG. 1 is a block diagram of a wireless signal strength monitoring system 100 in accordance with the examples disclosed herein. The wireless signal strength monitoring system 100 is configured to generate a wireless signal strength driver model 162 which identifies the various drivers or factors that contribute to the strength of the wireless signals in a wireless communication network 150. In an example, the wireless communication network 150 can include a cellular network that enables cellular communications between mobile devices on the network 150. In another example, the wireless communication network 150 may include a wireless local area network (WLAN) or any other type of wireless communication network(s). The monitoring system 100 can be further configured to monitor strength of wireless signals with the wireless communication network 150 which connects a plurality of network entities such as but not limited to access points 152-2, 152-4 that service mobile devices 152-6, 152-8, etc. A number of interlinked processes on the wireless communication network 150 enable communication by the mobile devices 152-6, 152-8, etc. as a result of which enormous amount of log data are generated in order to track the interlinked processes. The locations of the mobile devices 152-6, 152-8 are obtained based on information from the enhanced global-positioning systems (GPS), observed time differences and estimated signal departures. Various data sources on the wireless communication network 150 such as the access points 152-2, 152-4 and the mobile devices 152-6, 152-8 emit data related to the interlinked processes. The data can be stored in unstructured format in activity logs 110 in the local storage units of the corresponding network entities. The activity logs 110 of the network entities can include the records of signals received/transmitted, the date/time stamps of the exchange signals, the errors which may have occurred during the exchange of signals, the location data of the network entity if the entity is a mobile unit such as a mobile device, any changes to hardware/software configuration of the entity, records of the user authorization requests, etc. The wireless signal strength monitoring system 100 can be configured to access and analyze the activity logs 110 for determining attributes of the wireless communications, including the strength of the wireless signals, at various points or locations of the wireless communication network 150 thereby improving the service that can be provided to mobile users of the wireless communication network 150.

The monitoring system 100 includes a log analyzer 102, a feature identifier 104, a model builder 106 and a wireless signal optimizer 108 in accordance with the examples disclosed herein. In an example, the wireless signal strength monitoring system 100 can be coupled to a data store 170 for storing the various pieces of information/data generated during the various processes. The log analyzer 102 analyzes the activity logs 110 to extract multilevel token sets including one or more sets of bigrams, trigrams or other n-gram token sets with n being greater than 1. Unigrams where n=1 capture each word separately, as a result, the context associated with a word is generally lost when the logs are tokenized. For example, a bigram with two words 'unauthorized user' provides greater context and information as compared to two unigrams 'unauthorized' and 'user'. Similarly, a log entry such as "MAC174532:00 is associating to a RogueAP" can be parsed into unigrams, bigrams, trigrams, etc. For example, it can be parsed into a set of bigrams such as "MAC174532:00 is", "is associating", "associating to", "a RogueAP" which can then be used as features for building wireless signal strength driver model 162 if the set of bigrams scores the highest of all the multilevel token sets when scores are estimated in accordance with the methodologies detailed herein. A plurality of multilevel token sets 122 corresponding to bigrams, trigrams, etc. are thus generated. The log analyzer 102 can use a selection methodology for selecting tokens for further processing from each of the plurality of the multilevel token sets for generating the wireless signal strength driver model 162.

The feature identifier 104 accesses and selects one of the plurality of multilevel token sets 122 for generating a feature set 142 that is used for building the wireless signal strength driver model 162. The feature identifier 104 is further configured to analyze the logs and identify particular words or phrases to be used as topics that also form a part of the feature set 142 for building wireless signal strength driver model 162. In an example, the top m conversant topics in the activity logs 110 are obtained by the feature identifier 104. The multilevel token set and the topics can be selected based on predetermined scoring methodologies detailed herein. Furthermore, the feature identifier 104 can be configured to extract hypernyms to the topics identified from the logs.

The identified features from the feature set 142 are used by the model builder 106 to generate the wireless signal strength driver model 162. In addition to receiving the feature set 142, the model builder 106 can be further configured to create smaller clusters of homogenous logs based on logical factors such as the source of the logs. The smaller clusters of logs can be created as subnets or classes of interest. The features from the feature set 142 and the classes of interest from the subnets are used to generate the wireless signal strength driver model 162. In an example, a multinomial logit model can be used where the target or independent variables correspond to tags or classes of interest from the subnet. The level of significance of each of the features can be obtained and features which form the key drivers 166 of wireless signal strength can be identified. The example key drivers can include but are not limited to, network bandwidth, geographical proximity, changing GPS location, multiple unit authorization, etc.

The information regarding the key drivers 166 thus identified is passed on to the wireless signal optimizer 108 which is configured to effectuate actions within the wireless communication network 150 to improve signal strengths for the mobile devices 152-6, 152-8, etc. The actions effectuated by the wireless signal strength monitoring system 100 can take various forms. In an example, the wireless signal optimizer 108 can receive information regarding various attributes of the mobile devices 152-6, 152-8, etc., and determine the wireless signal strengths at each of the mobile devices 152-6, 152-8, etc. A notification can be transmitted to one or more of the mobile device(s) 152-6, 152-8, etc., or another network entity of the wireless communication network 150 regarding an action to execute for improving the wireless signal strength if a weak signal is identified at any of the mobile devices 152-6, 152-8, etc. Similarly, a message can be sent to a mobile device or a security/user authorization component of the wireless communication network 150 regarding a security breach or an instance of multiple login authorizations. Therefore, the wireless signal strength monitoring system 100 enables the wireless communication network 150 to maintain the strength of the wireless signals at the mobile devices thereby improving the quality of service. In an example, the wireless signal strength driver model 162 can be refreshed periodically (e.g., fortnightly, monthly, etc.,) so that new drivers of signal strength can be discovered and monitored.

Figure 2:
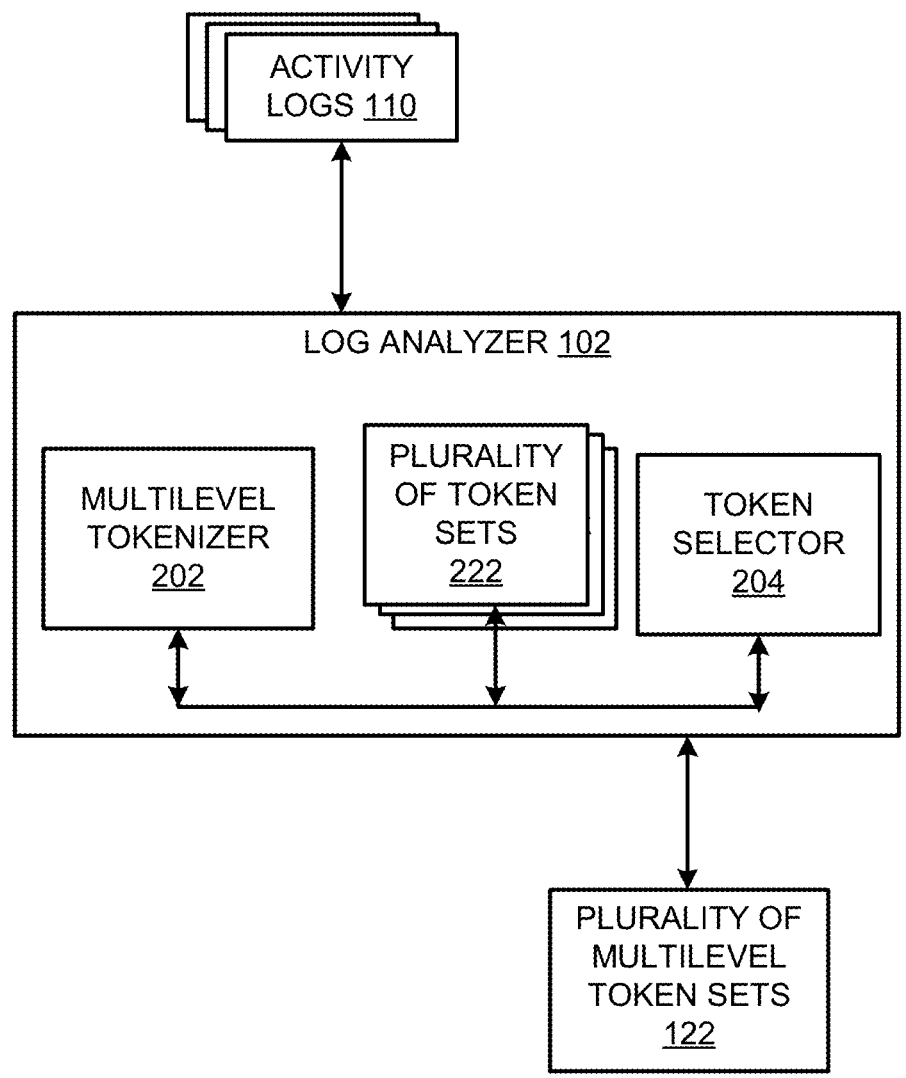
FIG. 2 shows a block diagram of a log analyzer in accordance with the examples disclosed herein.

FIG. 2 shows a block diagram of the log analyzer 102 in accordance with the examples disclosed herein. The log analyzer 102 includes a log tokenizer 202, and a token selector 204. The log tokenizer 202 can parse the activity logs 110 based on a given set of rules. Accordingly, the activity logs 110 can be split into a plurality of token sets 222. In an example, the plurality of token sets 222 can include bigrams, trigrams, or other n-grams where n>1. In the domain of natural language processing (NLP), n-grams are contiguous sequences of n characters from a piece of text. The characters can form words, phonemes or another basic element of language as required. The n-gram tokens are further processed as detailed infra and used as inputs to the model builder 106. A topic model is generally built on words and the wireless signal strength driver model 162 can be generated from standalone unigram tokens. However, a topical n-gram or a topic model which constructs latent topics as tag of phrases and not a bag of words can extract an added level of context. Similarly, when used to construct wireless signal strength driver model 162 the bag of phrases can add greater context and aid in identifying the drivers of the wireless signal strength more accurately than a bag of words. Often, a large number of n-grams created from the activity logs 110 have very few incidences leading to aggravated levels of sparsity which can lead to complications in the later stages of the model building procedure. Therefore, methods are implemented by the log analyzer 102 to preserve only a specific set of n-grams that are semantically significant in each of the plurality of multilevel token sets 122.

Accordingly, the token selector 204 estimates a Ted Dunning $G^2$ score for each of the tokens in the plurality of token sets 222. Ted Dunning's $G^2$ is a similar likelihood ratio test that compares the probability estimate of a specific token B being present when token A is identified to the marginal distribution of the terms which includes both A and B. If the existence of A does not depend on that of B, then the estimated probabilities can be similar. However, if the occurrence of token B depends on the occurrence of token A, then the probability estimates can vary significantly. Referring to an example log entry, "MAC174532:00 is associating to a RogueAP" the token CA Rogue AP" is retained as a feature upon the estimation of the Ted Dunning $G^2$ score. Each of the plurality of token sets 222 is processed and the semantically significant tokens are retained in each token set which are output as the plurality of multilevel token sets 122 for further processing.

Figure 3:
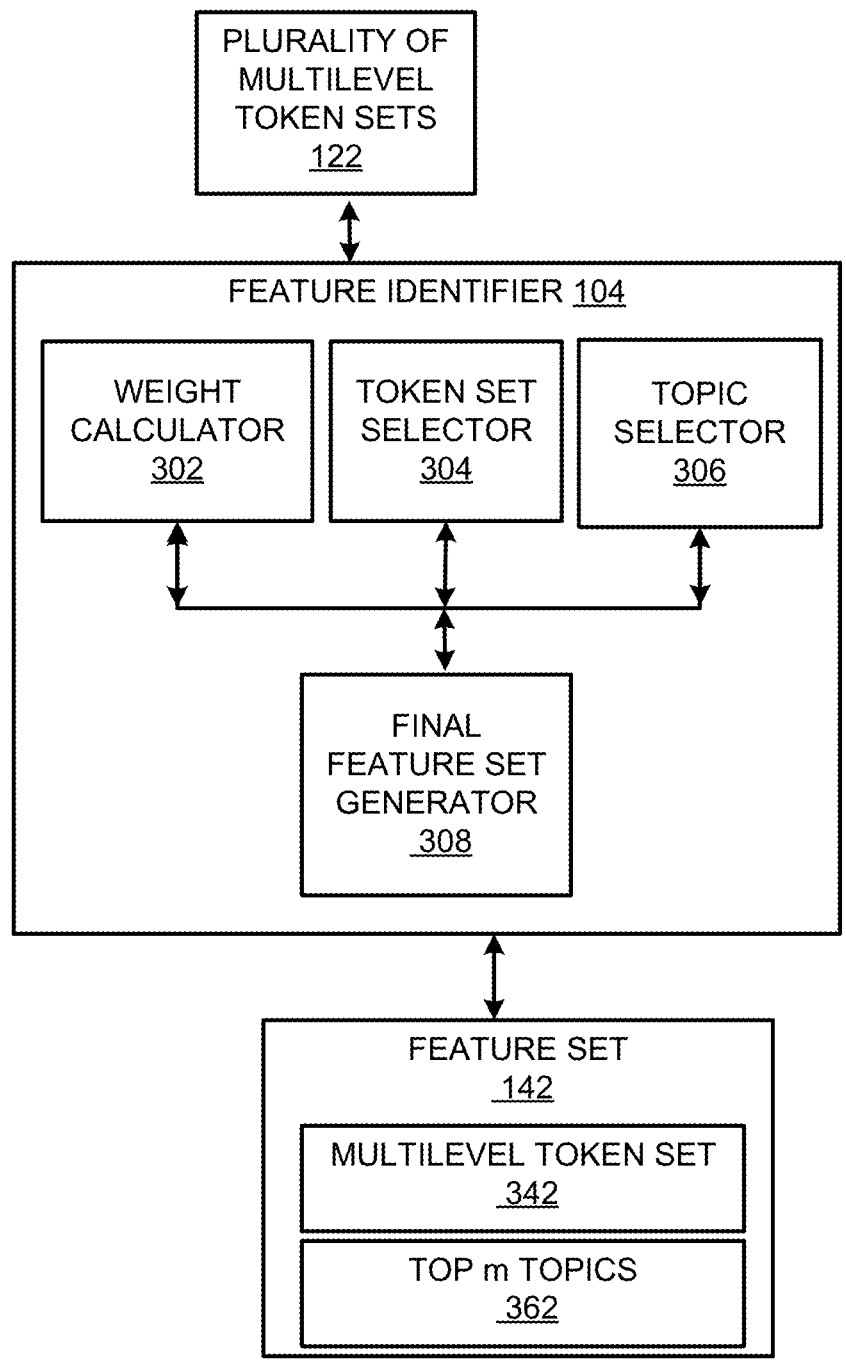
FIG. 3 shows a block diagram of a feature identifier in accordance with the examples disclosed herein.

FIG. 3 shows a block diagram of the feature identifier 104 in accordance with the examples disclosed herein. The feature identifier 104 includes a weight calculator 302, a token set selector 304, a topic selector 306 and a final feature set generator 308. The weight calculator 302 accesses and calculates TF-IDF scores for each of the plurality of multilevel token sets 122. The TFIDF score can provide a numerical measure that reflects how important a word is to a document, a collection or corpus. In this case, the TFIDF score can indicate the importance of each n-gram to the corpus or collection of the activity logs 110. The token set selector 304 compares the TFIDF score of the plurality of multilevel token sets 122 and selects one of the plurality of multilevel token sets 122 with the highest TFIDF score as the selected multilevel token set 342 for inclusion into the feature set 142.

The unstructured data in the activity logs 110 is modeled in a manner that only the most frequent and similar latent structures are established. Obtaining smaller representations of the constituent units of the logs in turn allows analysis of the complete data in an efficient manner while upholding the necessary statistical associations holding utilities for wireless signal strength driver modeling task. The topic selector 306 included in the feature identifier 104 achieves topic modeling with various approaches such as but not limited to LDA, LSI, etc. When employing LDA, the document term weighting can be term frequency (TF) weighting with normalization per token set. However if the TF weighting is used, it can undermine the less frequent words in the activity logs 110, which words although infrequent, might be important drivers for the target variable or the wireless signal strength. Therefore, the topic selector 306 can generate document-term matrices with both TF weighting as well as TFIDF weighting. The TF document term matrix is then passed to the LDA process. The outcome after fitting the LDA model to the activity logs 110 is a bag of n-grams which form the top m (where m is a natural number) conversant topics 362 in the documents. Here, instead of obtaining the bag of words, a bag of n-grams is obtained as the tokenization created n-grams instead of unigrams. Hypernyms are extracted from the topics obtained using the LDA. The feature set generator 308 receives the selected multilevel token set 342 and the top m topics 362 for the generation of the feature set 142.

Figure 4:
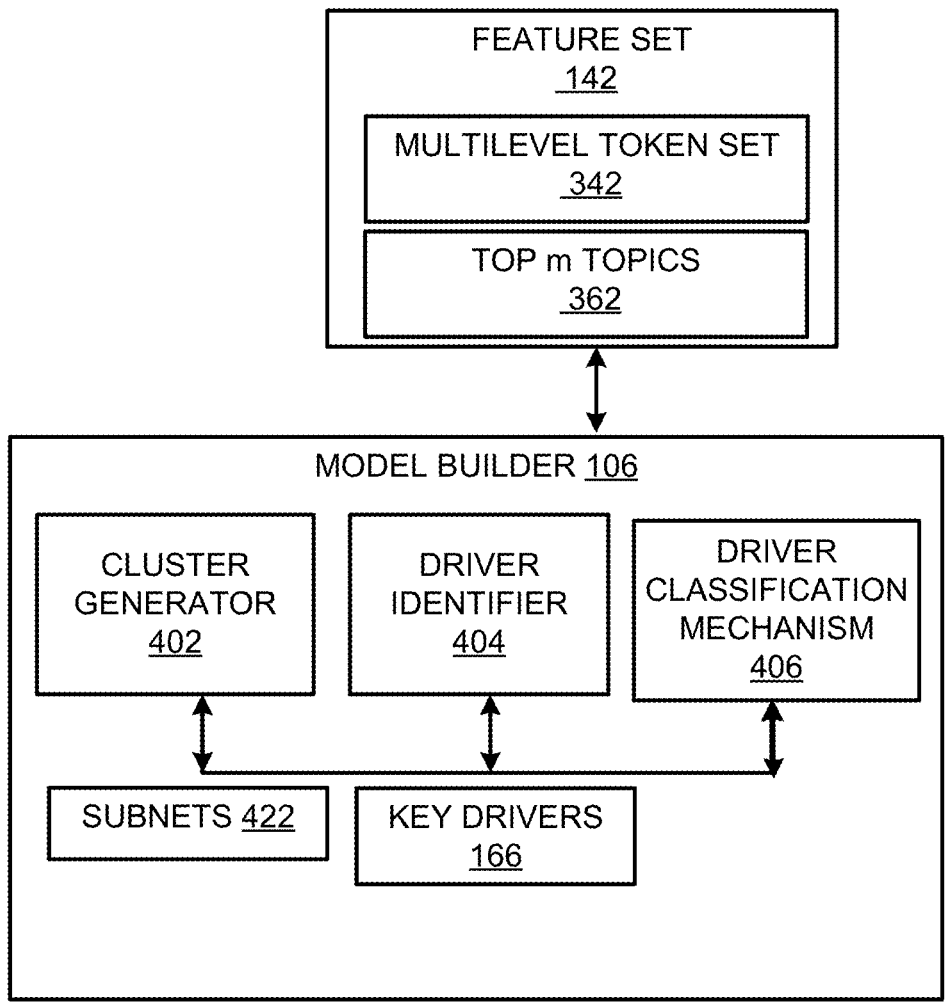
FIG. 4 shows a block diagram of a model builder in accordance with the examples disclosed herein.

FIG. 4 shows a block diagram of the model builder 106 in accordance with the examples disclosed herein. The model builder 106 includes a cluster generator 402 for creating smaller clusters of homogenous logs based on logic factors such as the source. The cluster generator 402 is configured to create smaller clusters of the enormous number of the activity logs 110 based on logical factors with a statistical overlay. The smaller sets of logs thus created can be separately delved into deeper for cluster-specific drivers for wireless signal strength driver model 162. The cluster generator 402 accesses the document term matrices with the TFIDF weighing and processes the matrices via the SOM methodology. As a result, clusters of homogenous logs or subnets 422 wherein terms with similar context are grouped together are obtained. The model builder 106 models the final features from the feature set 142 and the categorical variables obtained from the subnets 422 using a multinomial logit model or the wireless signal strength driver model 162. A driver identifier 404 identifies the target or independent variables as key drivers 166 for the wireless signal strength from the tags of the subnets 422. The dependent variable measures can include the TFIDF scores of the n-grams or one of the similarity or distance measures such as but not limited to Jaccard, Levenshtein, or even Cosine measure. The similarity scores can be indicative of similarity between the tags of the subnets used for generating wireless signal strength driver model 162 and the activity logs 110. In an example, a subset of the tags can be selected as the drivers or explanatory/independent variables or the target variables for building wireless signal strength driver model 162 which outputs the wireless signal strength as a function of the identified drivers. The driver model 162 based on the multinomial logit model is built using the feature set 142 and the identified key drivers 166. Logistic regression, also called a logit model, is a model used to predict the outcome of a categorical dependent variable based on one or more predictor variables (features). In the logit model, the log odds of the outcome is modeled as a linear combination of the predictor variables.

The driver classification mechanism 406 can be configured to execute a key-driver-analysis (KDA) for analyzing the association between the drivers identified from the logs and the wireless signal strength in order to identify the most significant drivers. More specifically, the KDA analysis enables identifying the features that have the biggest impact on an outcome variable, e.g., the wireless signal strength. In an example, multiple linear regression or logistic regression can be employed to compute a KDA. Using the KDA technique, the correlations between independent variables to generate the best linear combination to predict the outcome variable are examined and a model "fit" indicative of how well the independent variables predict the dependent variable is provided. While many variables may correlate, the KDA analysis allows selecting those variables that have greater impact than other variables with lesser impact which may be removed. The driver classification mechanism 406 can be further configured to estimate standardized beta values against each of the independent variables. The standardized beta values can provide the extent to which a driver affects the wireless signal strength and the manner in which the driver affects the wireless signal strength. In an example, a summary representation of wireless signal strength driver model 162 can include a p-value against each of the key drivers 166. The p-values denote the significance of the impact of the corresponding driver on the wireless signal strength.

Figure 5:
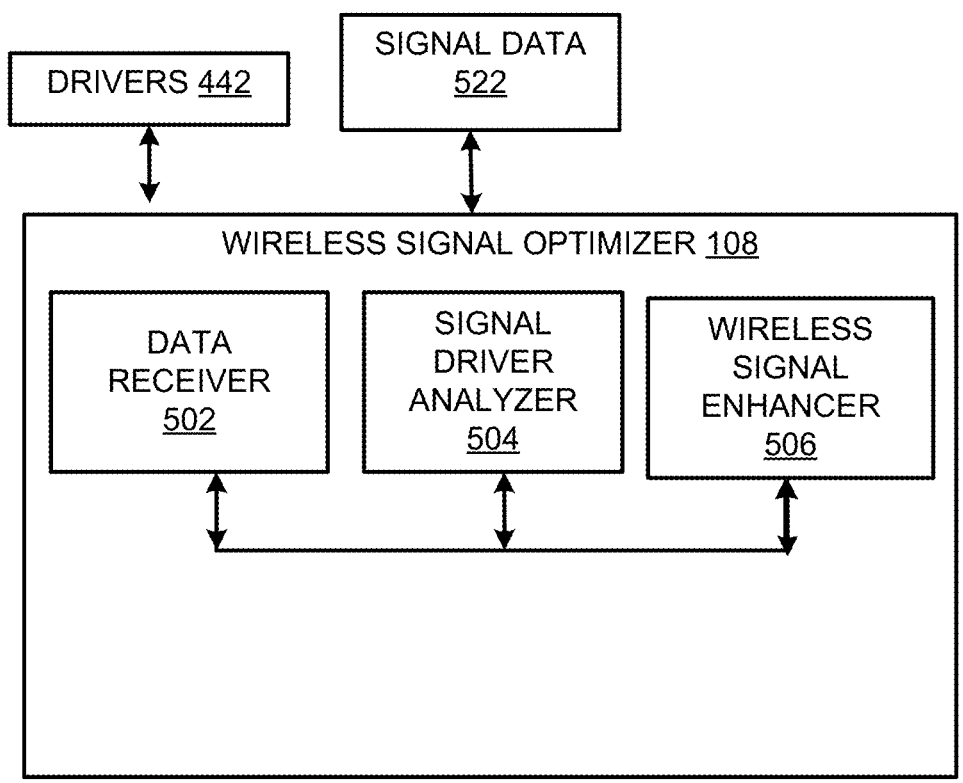
FIG. 5 shows a block diagram of a wireless signal optimizer in accordance with the examples disclosed herein.

FIG. 5 shows a block diagram of the wireless signal optimizer 108 in accordance with the examples disclosed herein. The wireless signal optimizer 108 can include a data receiver 502, a signal driver analyzer 504 and a wireless signal enhancer 506. The wireless signal optimizer 108 receives the data regarding the key drivers 166 from the model builder 106 via the data receiver 502 which also receives signal data 522 regarding the wireless signals exchanged at the mobile devices 152-6, 152-8, etc. In an example, the signal data 522 can be collected by the wireless communication network 150 via real-time tracking of the mobile devices 152-6, 152-8, etc., and passed on to the wireless signal strength monitoring system 100. The received signal data 522 can include but is not limited to attributes of the mobile devices 152-6, 152-8, etc., the wireless communication network etc., such as the unique identifiers of the mobile devices 152-6, 152-8, the geographical locations of the mobile devices e.g., the GPS coordinates of the mobile devices 152-6, 152-8 etc., the authorization info of the mobile devices 152-6, 152-8, etc. In an example, the wireless signal optimizer 108 can also have access to the databases of the wireless communication network 150 in order to exchange data with the components of the wireless communication network 150 other than the mobile devices. The signal driver analyzer 504 analyzes the signal data 522 using wireless signal strength driver model 162 by generating estimates of the wireless signal strengths at one or more of the mobile devices 152-6, 152-8, etc. The component values of each of the drivers contributing to the wireless signal strength can be obtained and compared to corresponding driver thresholds. Based on the comparisons, the specific drivers that fail to meet the corresponding driver thresholds are determined and various actions can be initiated within the wireless communication network 150 by the wireless signal enhancer 506. The driver thresholds can be determined empirically based on historical data in one example. It can be appreciated that although the wireless signal optimizer 108 is shown as being integrated with the wireless signal strength monitoring system 100, this is not necessary. The wireless signal optimizer 108 can be executed by a component of the wireless communication network 150 while being communicatively coupled to the wireless signal strength monitoring system 100 for updates from wireless signal strength driver model 162.

Figure 6:
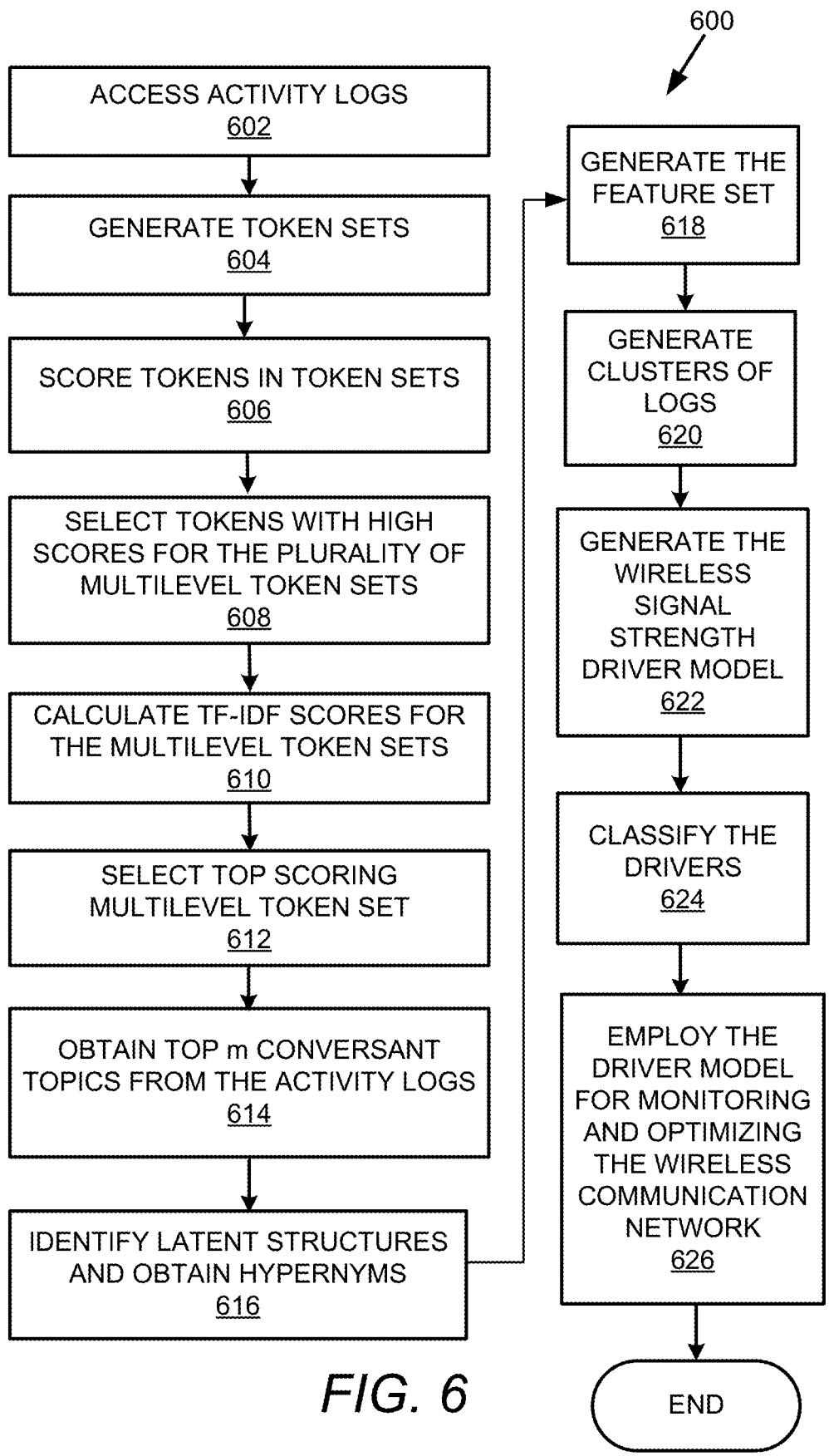
FIG. 6 shows a flowchart that details a method of optimizing strength of the wireless signals in a wireless communication network in accordance with the examples disclosed herein.

FIG. 6 shows a flowchart 600 that details a method of optimizing the strength of the wireless signals in the wireless communication network 150 in accordance with the examples disclosed herein. The method begins at 602 wherein the activity logs 110 from different sources of the wireless communication network 150 are accessed. At 604, the plurality token sets 222 including bi-grams, tri-grams or other n-grams (where n is a natural number greater than one) are generated by parsing the activity logs 110. Each of the tokens in the plurality of token sets is scored at 606 using, for example, the Ted Dunning $G^2$ methodology. A subset of the tokens with the highest scores are selected from each of the plurality of token sets 222 and grouped into the plurality of multilevel token sets 122 at 608 for further processing. At 610, the TFIDF scores are calculated for each of the plurality of multilevel token sets 122. The token set with the highest TFIDF score is selected at 612 for generating the feature set 142. In addition, the top m (where m is a natural number) conversant topics are obtained from the activity logs 110 at 614 for including within the feature set 142. In an example, TF measure is used for constructing Topic Models from which the top m conversant topics would be used as a subset of the features for the wireless signal strength driver model 162. For the topic models, the activity logs 110 with unstructured data of a primarily discrete nature is modeled in such a way that only the most frequent and similar latent structures get established. Therefore, smaller representations of the constituent units of the activity logs 110 are obtained which in turn allows analysis of the complete data in an efficient manner, while upholding the necessary statistical associations holding utilities for the driver modeling task. In an example, the LDA approach can be used to establish latent structures similar to the topics using the document term matrix with the TF weighting that was previously obtained for tokens. The optimal count of structures are obtained by a separate ML model. Non-limiting examples of ML models which can be used to obtain counts of latent structures include, Hierarchical Dirichlet Process (HDP), Akaike Information Criterion (AIC), Bayesian Information Criterion (BIC), etc.

The outcome after fitting the LDA model on the activity logs 110 is a set of bag of n-grams. As this step, instead of obtaining bags of words, bags of n grams are obtained since, the multilevel tokenizer 202 created n grams at block 604 and not unigrams Thus, for each of the top most structures the top n grams are obtained which best represent each of the individual structures. On establishing the latent token structures, the LDA provides posterior probability scores for each of the activity logs corresponding to each of the latent structures established. A particular activity log e.g., the activity log for a day can be classified as belonging to a particular latent structure for which the posterior probability is maximum. A latent structure tag is thus obtained for each log at 616. Hypernyms for the topics can additionally be generated at 616. The tokens within the latent structures having higher posterior probability estimates are extracted as the hypernyms. At 618, the feature set 142 is generated including the multilevel token set with the highest TFIDF score, the top topics and the hypernyms from the LDA model.

At 620, a plurality of subnets 422 or clusters of homogenous logs are generated by clustering the activity logs 110 based on logical premises such as but not limited to, a source. The subnets can be treated as classes of interest. In an example, SOMs can be used on the TFIDF scores of the plurality of multilevel token sets 122 to cluster similar logs into the classes or subnets. The driver model 162 is generated at 622 from the feature set 142 using a multinomial logit model wherein the independent variables can include the tags from the subnets 422. In an example, the tokens from the selected multilevel token set included in the feature set 142 can be identified as the drivers wherein the wireless signal strength driver model 162 outputs an estimation of the wireless signal strength as a function of the independent variables or the key drivers 166. The drivers are classified at 622 using the KDA based on the level of significance of the drivers on the wireless signal strength. The nature of effect that the drivers produce in the wireless signal strength i.e., whether a driver or a token drives the wireless signal strength in the positive or negative direction can also be determined from the KDA. The drivers can be thus classified into positive or negative drivers thereby providing insights on why a particular driver is causing an increase or decrease in the wireless signal strength. For example, a higher bandwidth can be classified as a positive driver while multiple user login can be classified as a negative driver. At 624, wireless signal strength driver model 162 is used for monitoring and optimizing the wireless signal strength in the wireless communication network 150.

Figure 7:
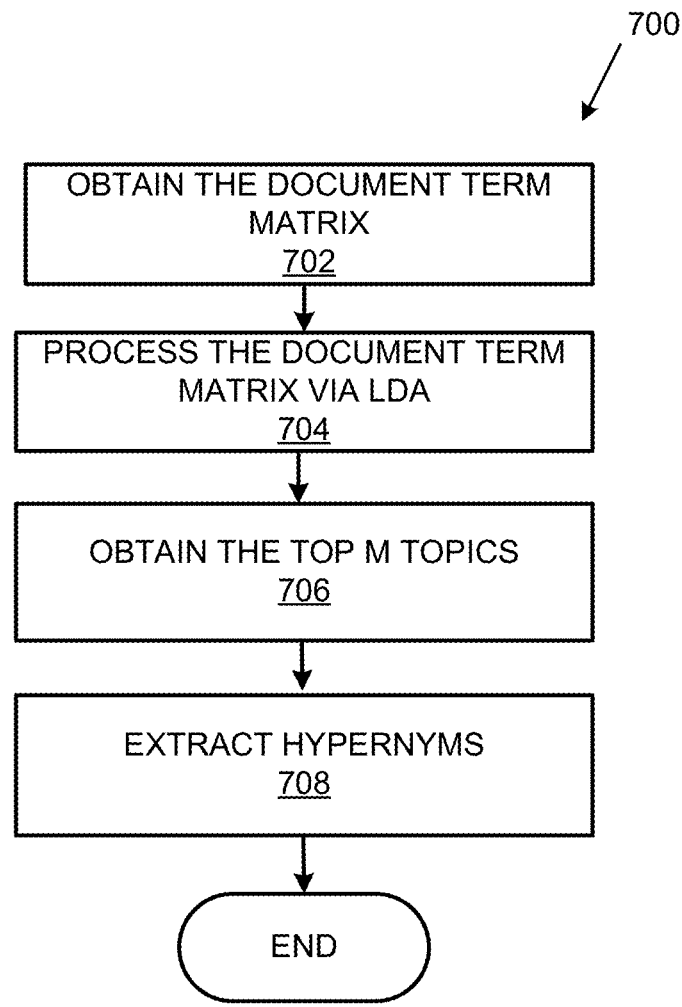
FIG. 7 shows a flowchart that details a method of obtaining topics from the activity logs in accordance with the examples disclosed herein.

FIG. 7 shows a flowchart 700 that details a method of obtaining the top m conversant topics from the activity logs in accordance with the examples disclosed herein. The method begins at 702, wherein the TF document term matrix is obtained by estimating the term frequency scores for the plurality of multilevel tokens. At 704, the document term matrix is processed via LDA. Example topics can include, Topic 1: {web attack, access denied, TCP Error . . . }, Topic 2: {loading configuration, cached denied, exit failure . . . }. At 706, the top m conversant topics in the activity logs 110 are obtained. At 708, hypernyms are extracted from the topics using the posterior probability estimates of the tokens belonging to the corresponding latent structure. Examples of hypernyms extracted from different structures are shown below based on the posterior gamma estimates from the LDA model for each of the tokens in each of the structures:

Struct 1={0.476*web attack+0.413*access denied+
0.337*TCP Error++0.521*firewall . . . } Top
Hypernym: Firewall Struct 2={0.887*loading configuration+0.405*cache
denied+0.33*exit failure++0.91*User Auth+ . . .
}

Top Hypernym: UserAuth

Struct 3={0.7*PAM_Unix SSDAuth+0.34*checking
getaddrinfo+0.23*reverse_mapping+0.84*Open
SSH . . . }

Top Hypernym: OpenSSH

Figure 8:
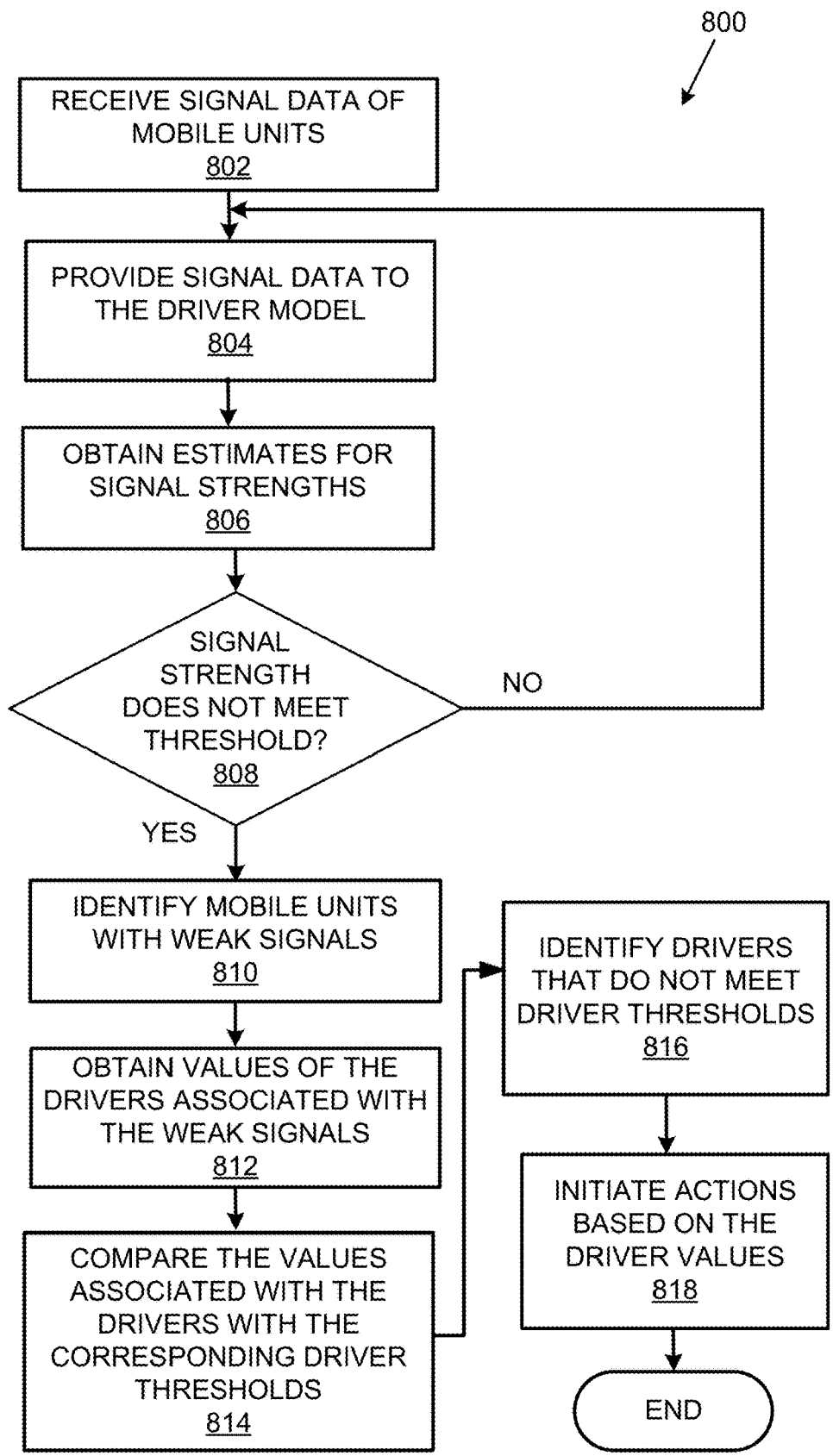
FIG. 8 shows a flowchart that details a method of optimizing the wireless signal strength within a wireless communication network in accordance with the examples disclosed herein.

FIG. 8 details a method of optimizing the wireless signal strength within the wireless communication network 150 in accordance with the examples disclosed herein. The signal data 522 regarding the wireless signal strength for one or more of the mobile devices 152-6, 152-8, etc., is received at 802. In addition to identifying indicia of the mobile devices 152-6, 152-8, etc., other attributes such as the GPS coordinates indicative of the geographical location of the mobile devices, data indicating changing geographical locations, the access points being utilized, the user authentications, etc. are also received. The signal data 522 is provided to wireless signal strength driver model 162 at 804. The estimates for the wireless signal strengths for the one or more mobile devices 152-6, 152-8, etc., are generated at 806 from wireless signal strength driver model 162 wherein the wireless signal strength forms the target variable which is estimated from the features of the feature set 142 which form the independent variables. The wireless signal strength estimates of each of the mobile devices 152-6, 152-8, etc., can be compared to a predetermined threshold signal strength at 808.

If it is determined at 808 that the wireless signal strength of each of the mobile devices 152-6, 152-8, etc., meets the threshold signal strength, the method returns to 802 to continue receiving the signal data 522 and monitoring the wireless communication network 150. If it is determined at 808 that the wireless signal strength of one or more of the mobile devices 152-6, 152-8, etc., does not meet the threshold signal strength, the mobile device(s) associated with the weak signal are identified at 810 using the identifying indicia received in the signal data 522. Additionally, the values of the drivers associated with the wireless signal strength estimates of the weak signals are obtained at 812. Examples of the drivers can include but are not limited to, network bandwidth, geographical proximity, variable GPS location, multiple authorizations, etc. At 814, each of the values of the drivers can be compared with the corresponding driver threshold. One or more drivers that do not meet the corresponding driver thresholds are identified at 816. Different actions can be initiated at 818 based on the values and variation in the values associated with the drivers that fail to meet the driver thresholds. In an example, the values of the various drivers can be compared to corresponding thresholds and the network entities to be activated when the driver values fail to meet the thresholds can be provided via programming instructions.

Various processes and network entities are notified based on the key drivers 166 identified from the wireless signal strength driver model 162. Certain examples of optimizing wireless signal strengths within the wireless communication network 150 are discussed herein by way of illustration and not limitation. In an example, the wireless signal strength monitoring system 100 can effect processes involving bandwidth maintenance by enabling real time tracking and detecting instances of low bandwidth. The processes can be notified regarding deteriorating wireless signal strength at one or more of the mobile devices 152-6, 152-8, etc., for effective control. For example, a network traffic control unit residing within the service provider network which monitors network activity and traffic shaping can be notified in case a bandwidth issue is identified as a key driver of the wireless signal strength in order to enable the bandwidth allocation adjustments. Similarly, if one of the mobile devices 152-6, 152-8, etc. is moving beyond the optimal geographical proximity, of a signal source such as an access point, the geographical proximity driver may fail to meet the corresponding driver threshold. The wireless signal optimizer 108 can generate a notification to the concerned mobile device about the increasing distance of the mobile device from the access point and the resultant fall in the signal strength. Additionally, the concerned site antennae/site antennae controller which would be having better geographical proximity to the mobile device can be effectively activated via an activation signal. The mobile device can also be notified of the probable drop in signal strength because of the varying GPS location.

Similarly, a mobile device or the corresponding element of the wireless communication network 150 can be alerted to a possible security breach if a security level of the mobile device fails to meet the corresponding security driver threshold. Similarly, for instances of multiple login authorizations, the site-antennae can be notified for simultaneous authorizations can help in allocating higher bandwidths. In the case of network firewalls being identified as one of the key drivers 166, both the security unit and content manager of the service provider network are notified to check and monitor the information content packets. In case of usage overflow, a system administrator is notified regarding the allotted bandwidth/information quota.

Figure 9:
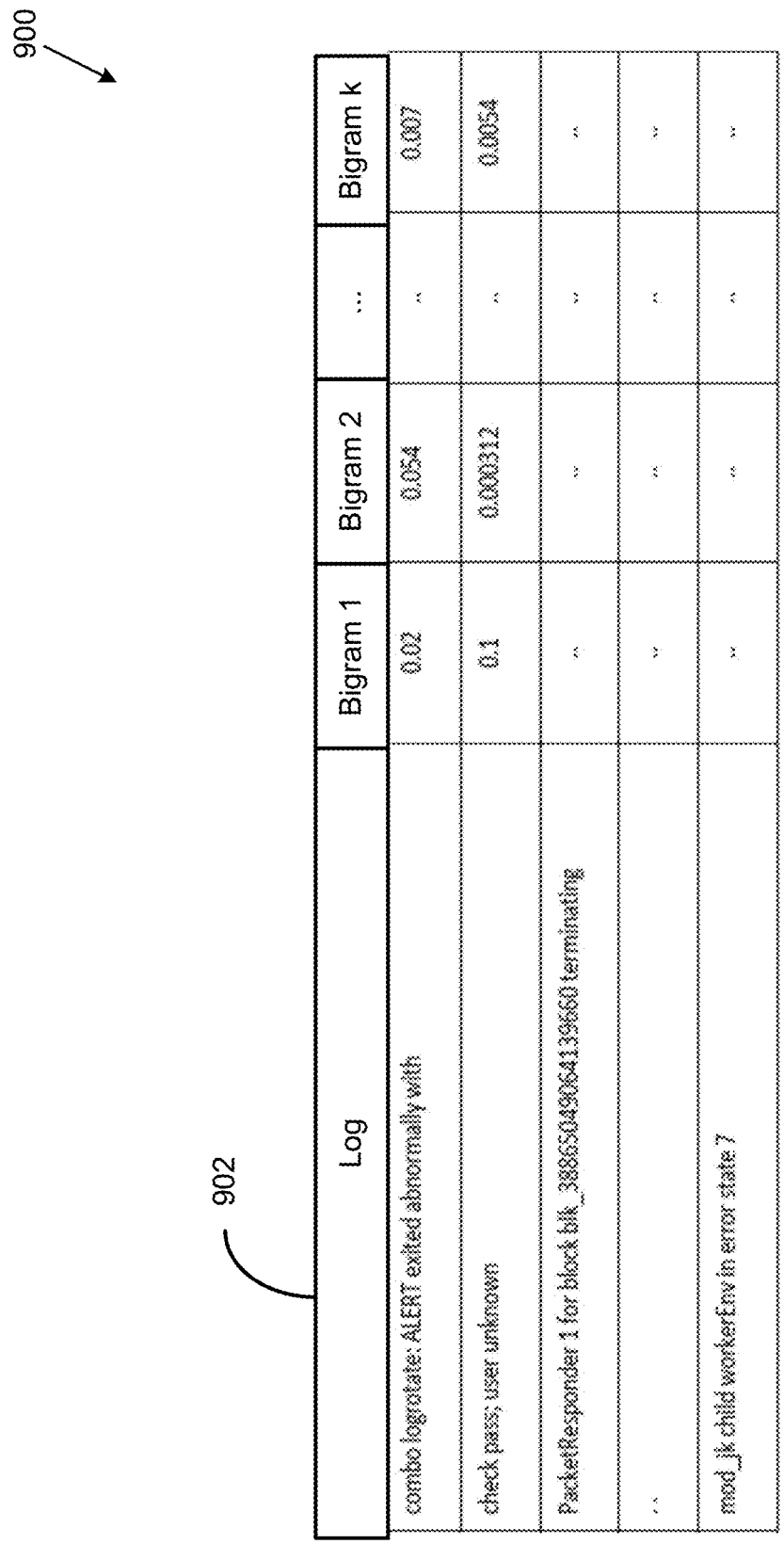
FIG. 9 illustrates an example document-term matrix created with term frequency (TF) and inverse document frequency (IDF).

FIG. 9 illustrates an example document-term matrix created with TF and IDF. The log 902 is analyzed into multi-level tokens or more particularly, bigrams which are used in the feature set 142 for generating wireless signal strength driver model 162. Term frequency weighting is a normalized frequency weight where the weight of each token (column) is calculated for each log (row) as:

TF weight (token $T$|Document $D$)=Frequency of
token $T$ in Document $D$/Total count of tokens in
Document $D$.

TFIDF weighting is the normalized frequency weight multiplied with the log of inverse document frequency. It is calculated as:

TF IDF weight (token $T$|Document $D$)=TF (token
$T$|Document $D$)*log (total documents in corpus/
count of documents containing token $T$).

Figure 10:
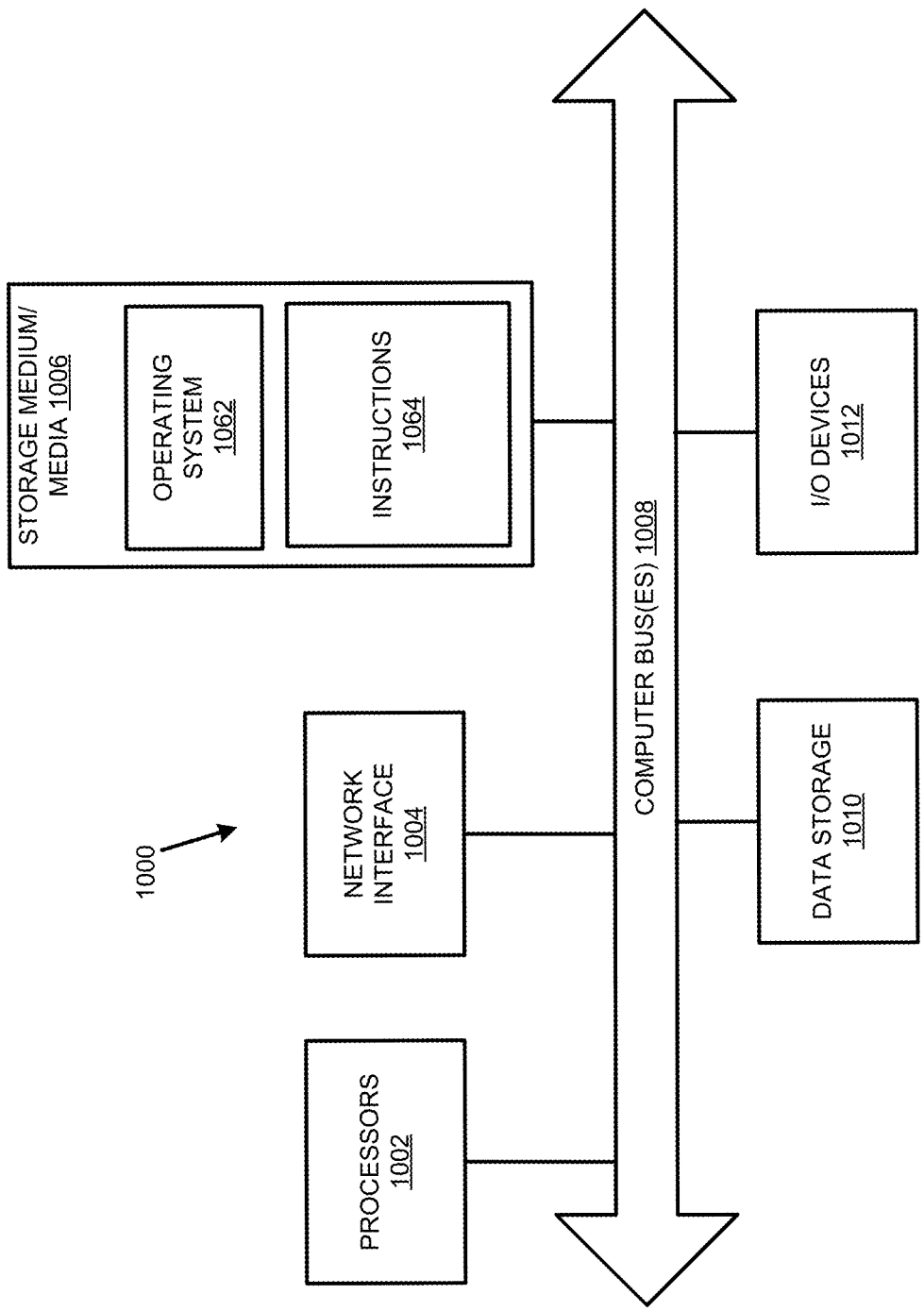
FIG. 10 illustrates a computer system that may be used to implement the wireless signal strength monitoring system in accordance with the examples disclosed herein.

FIG. 10 illustrates a computer system 1000 that may be used to implement the wireless signal strength monitoring system 100. More particularly, computing machines such as desktops, laptops, smartphones, tablets and wearables which may be used to generate or access the data from the wireless signal strength monitoring system 100 may have the structure of the computer system 1000. The computer system 1000 may include additional components not shown and that some of the process components described may be removed and/or modified. In another example, a computer system 1000 can sit on external-cloud platforms such as, Amazon Web Services, AZURE® cloud or internal corporate cloud computing clusters, or organizational computing resources, etc.

The computer system 1000 includes processor(s) 1002, such as a central processing unit, ASIC or other type of processing circuit, input/output devices 1012, such as a display, mouse keyboard, etc., a network interface 1004, such as a Local Area Network (LAN), a wireless 802.11x LAN, a 3G or 4G mobile WAN or a WiMax WAN, and a computer-readable medium 1006. Each of these components may be operatively coupled to a bus 1008. The computer-readable medium 1006 may be any suitable medium which participates in providing instructions to the processor(s) 1002 for execution. For example, the processor-readable medium 1006 may be non-transitory or non-volatile medium, such as a magnetic disk or solid-state non-volatile memory or volatile medium such as RAM. The instructions or modules stored on the processor-readable medium 1006 may include machine-readable instructions 1064 executed by the processor(s) 1002 to perform the methods and functions of the wireless signal strength monitoring system 100.

The wireless signal strength monitoring system 100 may be implemented as software stored on a non-transitory processor-readable medium and executed by the one or more processors 1002. For example, the processor-readable medium 1006 may store an operating system 1062, such as MAC OS, MS WINDOWS, UNIX, or LINUX, and code 1064 for the wireless signal strength monitoring system 100. The operating system 1062 may be multi-user, multiprocessing, multitasking, multithreading, real-time and the like. For example, during runtime, the operating system 1062 is running and the code for the wireless signal strength monitoring system 100 is executed by the processor(s) 1002.

The computer system 1000 may include a data storage 1010, which may include non-volatile data storage. The data storage 1010 stores any data used by the wireless signal strength monitoring system 100. The data storage 1010 may be used to store the feature sets, driver values and insights, actionable items or notifications generated by the wireless signal strength monitoring system 100.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A wireless signal strength monitoring system comprising:
    at least one processor;
    a non-transitory processor readable medium storing machine-readable instruction that cause the processor to:
        parse activity logs of a plurality of network entities within a wireless communication network, the plurality of network entities including at least mobile devices serviced by the wireless communication network;
        obtain a plurality of token sets from an output generated by parsing the activity logs, wherein each of the token sets includes tokens with phrases having two or more words;
        generate a plurality of multilevel token sets by selecting tokens from each of the plurality of token sets;
        select a multilevel token set from the plurality of multilevel token sets to construct a wireless signal strength driver model;
        determine topics from latent structures identified from the activity logs;
        create clusters of homogenous logs from the activity logs using groupings of tokens from one or more of the plurality of multilevel token sets;
        generate the wireless signal strength driver model by combining features including the selected multilevel token set and the topics wherein target independent variables for the wireless signal strength driver model include tags of the homogenous logs;
        identify drivers of wireless signal strength from the wireless signal strength driver model;
        determine effects of the drivers on the wireless signal strength; and
        effect processes in one or more of the plurality of network entities for improving wireless signal strength at one or more of the mobile devices based on the determination regarding the drivers affecting the wireless signal strength.

2. The wireless signal strength monitoring system of claim 1, wherein the instructions to obtain the plurality of multilevel token sets cause the processor to:
    calculate a Ted Dunning G2 score for each token of the plurality of token sets; and
    select as the plurality of multilevel token sets tokens from the plurality of token sets based on the Ted Dunning G2 scores.

3. The wireless signal strength monitoring system of claim 1, wherein the instructions for selecting the multilevel token set cause the processor to:
    obtain a term frequency inverse document frequency (tf-idf) score for each of the plurality of multilevel token sets; and
    further select one multilevel token set of the plurality of multilevel token sets with a top tf-idf score for the features of the wireless signal strength driver model.

4. The wireless signal strength monitoring system of claim 1, wherein the instructions to determine the topics cause the processor to:
    generate a document term matrix using term frequency (tf) weighing of tokens in the plurality of multilevel token sets.

5. The wireless signal strength monitoring system of claim 4, wherein the instructions to determine the topics cause the processor to:
    employ Latent Dirichlet Allocation (LDA) model on the document term matrix for establishing as the topics, top n-grams from the plurality of multilevel token sets, where n is a natural number and n>1.

6. The wireless signal strength monitoring system of claim 1, wherein the instructions for creating the clusters of homogenous logs cause the processor to:
    access the plurality of multilevel token sets; and obtain tf-idf scores for each of the tokens in the plurality of multilevel token sets.

7. The wireless signal strength monitoring system of claim 6, wherein the instructions for creating the clusters of homogenous logs cause the processor to:
generate the clusters of homogenous logs by applying self-organizing maps methodology over the tf-idf scores of the tokens.

8. The wireless signal strength monitoring system of claim 1, wherein the instructions for generating the wireless signal strength driver model cause the processor to:
construct the wireless signal strength driver model as a multinomial logit model from the features and the clusters of homogenous logs.

9. The wireless signal strength monitoring system of claim 8, wherein the instructions for determining the effects of the drivers cause the processor to:
obtain standardized beta coefficients associated with each of the features of the multinomial logit model; and
determine significance of one or more of the features as the drivers of the wireless signal strength based on the standardized beta coefficients.

10. The wireless signal strength monitoring system of claim 1, wherein the instructions for identifying the drivers of the wireless signal strength cause the processor to:
determine contribution of the features as the drivers to the wireless signal strength based on key-driver-analysis (KDA) of the standardized beta coefficients.

11. The wireless signal strength monitoring system of claim 1, wherein the instructions for identifying the drivers of the wireless signal strength cause the processor to:
identify at least network bandwidth, geographical proximity of a mobile device, variable global positioning system (GPS) location of the mobile device and multiple authorizations via the mobile device as the drivers of the wireless signal strength received at the mobile device.

12. The wireless signal strength monitoring system of claim 11, wherein the instructions to effectuate processes in one or more of the plurality of network entities cause the processor to:
receive signal data regarding wireless signal strength at a mobile device; and
determine values of the drivers contributing to the wireless signal strength of the mobile device from the signal data.

13. The wireless signal strength monitoring system of claim 12, wherein the instructions to effectuate processes in the entities cause the processor to:
determine values for bandwidth at the mobile device from the signal data via real-time tracking, wherein bandwidth is one of the drivers;
detect instances of low bandwidth from the signal data; and
provide feedback to one or more of the plurality of network entities regarding the low bandwidth.

14. A method of monitoring wireless signal strength using unstructured log data comprising:
receiving signal data of at least one mobile device, the signal data including at least attributes of the mobile device and a wireless communication network servicing the mobile device;
obtaining an estimate of wireless signal strength at the at least one mobile device based on the signal data by providing the signal data to a wireless signal strength driver model;
comparing the estimate of the wireless signal strength with a predetermined threshold signal strength;
determining that the wireless signal strength at the mobile device is low based on the comparison of the wireless signal strength with the predetermined threshold signal strength;
obtaining values of drivers within the wireless signal strength driver model for the mobile device, wherein the wireless signal strength driver model is developed from parsing activity logs of entities on the wireless communication network;
comparing the values of the drivers with corresponding driver thresholds;
identifying one or more of the drivers that fail to meet the driver thresholds; and
initiating actions within the wireless communication network based on the one or more drivers that fail to meet the driver thresholds, wherein the actions improve strength of the wireless signal at the mobile device.

15. The method of claim 14, wherein the driver failing to meet the threshold is a GPS location of the mobile device and initiating the actions further comprises:
generating a notification to the mobile device regarding a decrease in the wireless signal strength due to increasing distance of the mobile device from a signal source; and
alerting the signal source regarding increasing distance of the mobile device.

16. The method of claim 14, wherein the driver failing to meet the threshold is a network bandwidth and initiating the actions further comprises:
notifying processes involving bandwidth maintenance regarding a fall in the wireless signal strength of the mobile device.

17. The method of claim 14, wherein the driver failing to meet the threshold is a security level of the mobile device and initiating the actions further comprises:
notifying the mobile device of a possible security breach; and
notifying a site antenna of simultaneous authorizations for the mobile device if multiple authorizations causes the driver associated with security to fail the threshold.

18. A non-transitory processor-readable storage medium comprising machine-readable instructions that cause a processor to:
parse activity logs of a plurality of network entities within a wireless communication network, the plurality of network entities including at least mobile devices serviced by the wireless communication network;
obtain a plurality of token sets from an output generated by parsing the activity logs, wherein each of the token sets includes tokens with phrases having two or more words;
generate a plurality of multilevel token sets by selecting tokens from each of the plurality of token sets;
select a multilevel token set from the plurality of multilevel token sets to construct a wireless signal strength driver model;
determine topics from latent structures identified from the activity logs;
create clusters of homogenous logs from the activity logs using groupings of tokens from one or more of the plurality of multilevel token sets;
generate the wireless signal strength driver model by combining features including the selected multilevel token set and the topics wherein target independent variables for the wireless signal strength driver model include tags of the homogenous logs;

identify drivers of wireless signal strength from the wireless signal strength driver model;

determine effects of the drivers on the wireless signal strength; and effect processes in one or more of the plurality of network entities for improving wireless signal strength at one or more of the mobile devices based on the determination regarding the drivers affecting the wireless signal strength.

19. The non-transitory processor-readable storage medium of claim 18, wherein instructions to effect processes in one or more entities further comprise instructions that cause the processor to:

receive signal data of at least one mobile device, the signal data including at least attributes of the mobile device and the wireless communication network; and determine that a wireless signal strength of the mobile device is low based on a comparison of the wireless signal strength with a predetermined threshold signal strength.

20. The non-transitory processor-readable storage medium of claim 19, wherein instructions to effect processes in one or more entities further comprise instructions that cause the processor to:

obtain values of the drivers for the at least one mobile device;

compare the values of the drivers with corresponding driver thresholds;

identify one or more of the drivers that fail to meet the driver thresholds; and initiate actions within the wireless communication network based on the one or more drivers that fail to meet the driver thresholds, wherein the actions improve strength of the wireless signal at the mobile device.

* * * * *